Nov. 3, 1959 D. R. WHITE 2,910,830
FLUID FLOW APPARATUS
Filed Dec. 21, 1955 2 Sheets-Sheet 1

Inventor:
Donald R. White,
by Paul A. Frank
His Attorney.

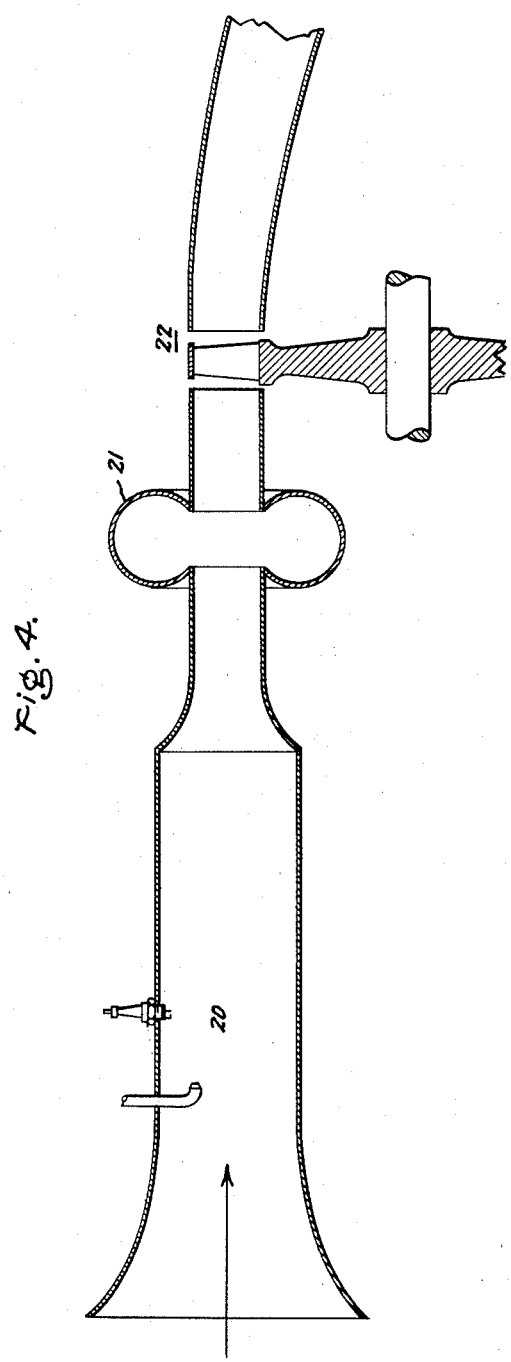

United States Patent Office 2,910,830
Patented Nov. 3, 1959

2,910,830

FLUID FLOW APPARATUS

Donald R. White, Jonesville, N.Y., assignor to General Electric Company, a corporation of New York Application December 21, 1955, Serial No. 554,439

2 Claims. (Cl. 60—39.77)

My invention relates to fluid flow apparatus and more particularly to such apparatus for smoothing a pulsating fluid stream.

It is often necessary or desirable to provide a smooth, non-pulsating fluid stream. For example, such a problem exists when a resonant combustor is utilized to provide a high velocity, hot fluid stream to drive a gas turbine. While the gas turbine requires a smooth inlet gas stream for efficient operation, the resonant combustor produces a pulsating flow. It is also desirable to provide a silencer for a high velocity stream without large pressure losses. The invention of the present application provides a novel fluid flow apparatus which converts such a pulsating flow into a smooth gas stream with an efficient silencing effect.

Accordingly, it is an object of my invention to provide an improved fluid flow apparatus.

It is another object of the invention to provide an improved fluid flow apparatus which smooths a pulsating fluid stream.

It is a further object of the invention to provide an improved fluid flow apparatus which can be used in a gas turbine cycle between the resonant combustor and the turbine.

In carrying out my invention in one form, a hollow annular member is positioned adjacent the edges of two opposed, hollow, spaced tubes or conduits which are axially aligned to provide a fluid flow apparatus.

These and various other objects, features, and advantages of the invention will be better understood from the following description taken in connection with the accompanying drawing in which:

Fig. 4 is a schematic diagram of the application of this invention as set forth in the above objects.

Figure 1:
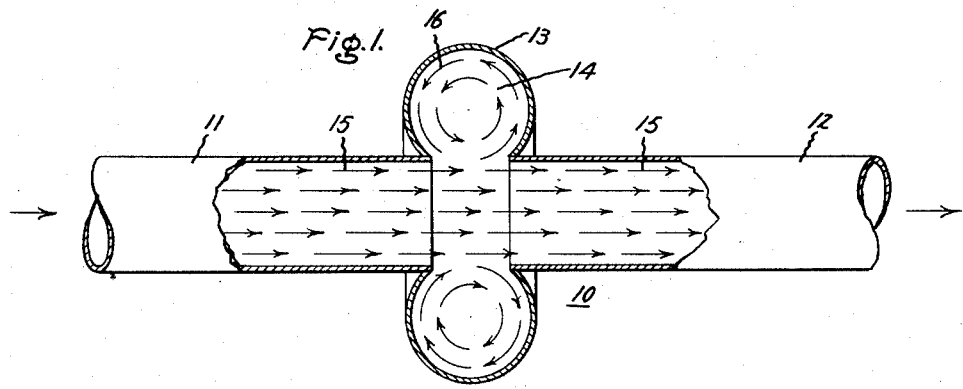
Fig. 1 is a sectional view of a fluid flow apparatus which embodies my invention.

In Fig. 1 of the drawing a fluid flow apparatus 10 is shown which comprises a hollow inlet tube or entrance section 11, and a hollow outlet tube or exit section 12 spaced apart and aligned axially with each other. A hollow member 13 which defines a chamber 14 is positioned adjacent the opposed edges of tubes 11 and 12 to close the space therebetween. It may be seen from an examination of Figs. 1 through 4 that the entrance and exits sections 11 and 12 not only are axially aligned with each other but also present a smooth continuous equal diameter bore passing through the member 13. Member 13 extends laterally outwardly from these tubes in a torus-shaped form to produce an effective toroidal fluid vortex within its chamber 14. Such a toroidal vortex may best be described with relation to Figs. 1 through 3 as being radially rotating. Tubes 11 and 12, and member 13 can be an integral structure or member 13 can be mounted on the opposed edges of tubes 11 and 12 by suitable means, such as, welding. If it is desired, member 13 can be constructed in other shapes. A smooth or non-pulsating gas stream indicated by arrows 15 is admitted at the inlet end of tube 11, flows through tubes 11 and 12, and is discharged from the outlet end of tube 12. A gas stream indicated by arrows 16 is trapped within chamber 14 of member 13 and is rotated in a vortical manner by stream 15.

Figure 2:
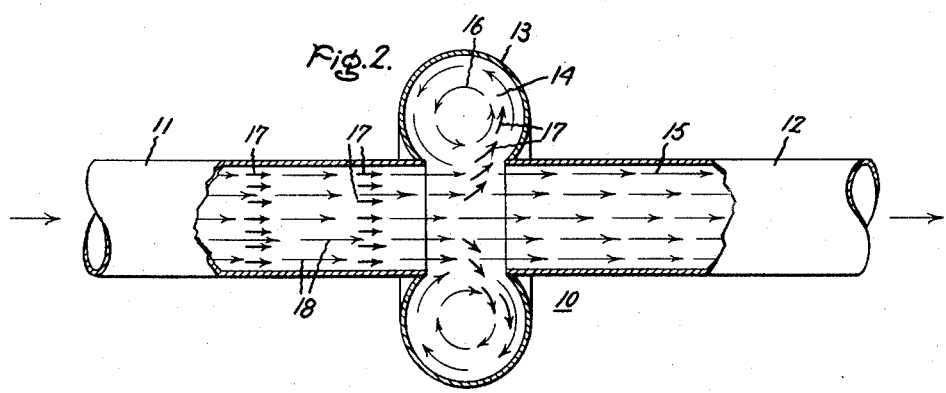
Fig. 2 is a sectional view of the apparatus shown in Fig. 1 in which a portion of a high pressure gas pulse is fed from the inlet conduit, tube, or other entrance section into the annular member.

In Fig. 2 of the drawing, fluid flow apparatus 10 is shown in which a gas stream transmitting pulsations of both higher and lower than average pressure or velocity is admitted at the inlet end of tube 11 and discharged at the outlet end of tube 12. A plurality of higher than average pressure gas pulses are indicated by arrows 17 while gas pulses which are below average pressure are shown as arrows 18. A portion of each gas pulse 17 is fed into chamber 14 from tube 11 resulting in increased angular velocity of vortical stream 16 while the remaining flow continues as smoother gas stream 15 through tube 12 and its outlet end.

Figure 3:
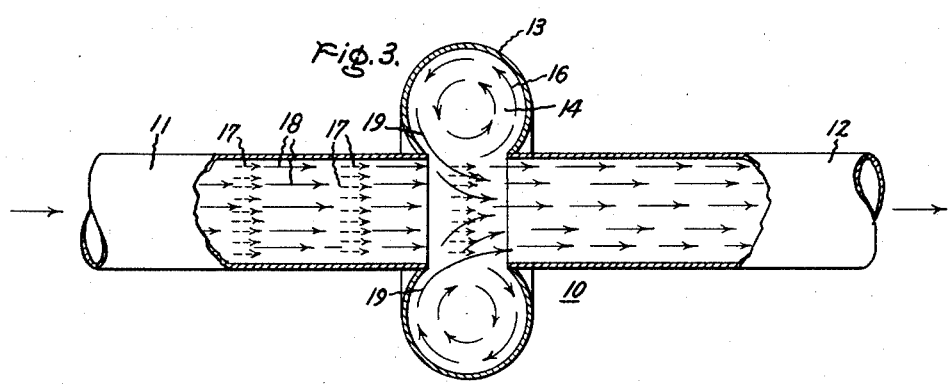
Fig. 3 is a sectional view of the apparatus shown in Fig. 1 in which a portion of vortical gas is fed from the annular member into the outlet conduit, tube, or other exit section during a low pressure gas pulse.

In Fig. 3, a plurality of lower than average pressure gas pulses 18 between gas pulses 17 flow through tube 11 to member 13. The decreased pressure in stream 18 causes vortex 16 to expand and to feed gas as indicated by arrows 19 into stream 18 to produce a smoother gas stream 15 through tube 12. Thus, a pulsating fluid flow is converted continuously into a smoother flow which can be utilized directly in a suitable device, such as, a turbine.

Fig. 4 illustrates the exemplary turbine application of this invention as heretofore set forth. In Fig. 4 a resonant burner 20 supplies hot gases, which by the nature of the resonant burner are pulsating, as opposed to a uniform pressure flow. As described for Figs. 2 and 3, these pulsations are substantially absorbed in flowing through the apparatus 21 of this invention, and the smooth flow is then conducted through the turbine 22.

As will be apparent to those skilled in the art, the objects of my invention are attained by providing two opposed, hollow, spaced tubes in axial alignment between which a hollow annular member is positioned.

While other modifications in this invention and variations of apparatus which may be employed within the scope of the invention have not been described, the invention is intended to include all such as may be embraced within the following claims.

What I claim as new and desire to secure by Letters Patent of the United States is:

1. A fluid flow pulsation smoothing apparatus comprising in combination, a conduit, said conduit having spaced apart entrance and exit sections, said entrance and exit sections having the same slope characteristics and defining an unobstructed flow passage, a hollow toroidal chamber intermediate said entrance and said exit sections and in coaxial relationship thereto, the said toroidal chamber and the said entrance and exit sections defining an opening between the interior of the conduit and the interior of the toroidal chamber to provide therein a toroidal vortical flow of fluid separate from and surrounding the flow in said conduit and in tangential contact therewith.

2. In a fluid flow pulsation smoothing apparatus adapted to conduct the products of combustion emanating from a resonant combustor to a turbine wheel, the combination comprising an exit conduit from said resonant combustor, an entrance conduit to said turbine wheel, said entrance conduit being spaced from and in axial alignment with said exit conduit, said entrance and said exit conduit having equal diameter openings, a hollow torus chamber enclosing the space between said entrance and said exit conduit and in coaxial relationship therewith, the said torus chamber and the said entrance and exit conduits providing an unobstructed passage therethrough, the juncture of said toroidal chamber and said conduit defining an opening between the interior of said chamber and the interior of said conduit such that a flow of gases through said conduits generates a torus of vortically moving gases in said chamber to dampen pulsation in the gas flow in said conduits.

References Cited in the file of this patent

UNITED STATES PATENTS

| | | |
|---|---|---|
| 2,084,462 | Stalker | June 22, 1937 |
| 2,206,193 | Kadenacy | July 2, 1940 |
| 2,522,118 | Kadenacy | Sept. 12, 1950 |
| 2,704,555 | Dall | Mar. 22, 1955 |